United States Patent [19]

Mawhirt

[11] Patent Number: 5,137,693
[45] Date of Patent: Aug. 11, 1992

[54] SPRING BIASED TEST TUBE HOLDER

[75] Inventor: James A. Mawhirt, Brooklyn, N.Y.

[73] Assignee: Miles Inc., Elkhart, Ind.

[21] Appl. No.: 559,366

[22] Filed: Jul. 30, 1990

[51] Int. Cl.5 .............................................. B01L 9/06
[52] U.S. Cl. ..................................... 422/104; 422/99;
422/102; 206/446; 206/485; 220/402; 220/408;
220/410; 220/506; 215/12.1
[58] Field of Search ........................ 422/99, 102, 104;
435/809; 211/71, 74; 206/560, 562, 446, 485;
220/445, 448, 402, 408, 410, 506; 215/12.1;
248/188.5

[56] References Cited

U.S. PATENT DOCUMENTS

| | | | |
|---|---|---|---|
| 351,208 | 10/1886 | Searles | 211/74 X |
| 1,360,977 | 11/1920 | Rolston | 211/74 X |
| 1,744,054 | 1/1930 | Mosgrove | 211/74 |
| 1,980,930 | 11/1934 | Reyniers | 211/74 |
| 2,364,753 | 12/1944 | Richter | 215/12.1 |
| 2,746,822 | 5/1956 | Copenhaver | 248/188.5 |
| 2,761,580 | 9/1956 | Tamboles | 215/12.1 X |
| 3,375,934 | 4/1968 | Bates | 211/74 X |
| 3,709,429 | 1/1973 | McKenzie et al. | 211/74 X |
| 3,947,140 | 3/1976 | Thomas | 248/188.5 X |
| 4,517,851 | 5/1985 | Tice | 422/104 X |
| 4,534,465 | 8/1985 | Rothermel et al. | 422/104 X |
| 4,772,068 | 9/1988 | Gleckler et al. | 248/188.5 X |
| 4,944,924 | 7/1990 | Mawhirt et al. | 422/104 |

Primary Examiner—Robert J. Warden
Assistant Examiner—Stephanie Blythe
Attorney, Agent, or Firm—Rodman & Rodman

[57] ABSTRACT

The test tube holder includes an elongated tubular member which supports a pivot member and receives a removable adapter member. The adapter member accommodates a test tube and can be interchanged with another adapter member that accommodates a different size test tube. Biasing springs are provided in the adapter member to hold the test tube therein. The biasing force of the biasing springs against the test tube is predetermined to permit easy insertion and removal of the test tube from the adapter member. The test tube holder which includes the adapter member can be joined to other similar test tube holders in a manner which permits relative pivoting and tilting of one test tube holder with respect to another test tube holder. The test tube holder further includes a detent arrangement for inseparably detenting the adapter member in the tubular member when a test tube is present in the tubular member. Removal of the test tube from the test tube holder enables the adapter member to be separated from the tubular member.

17 Claims, 4 Drawing Sheets

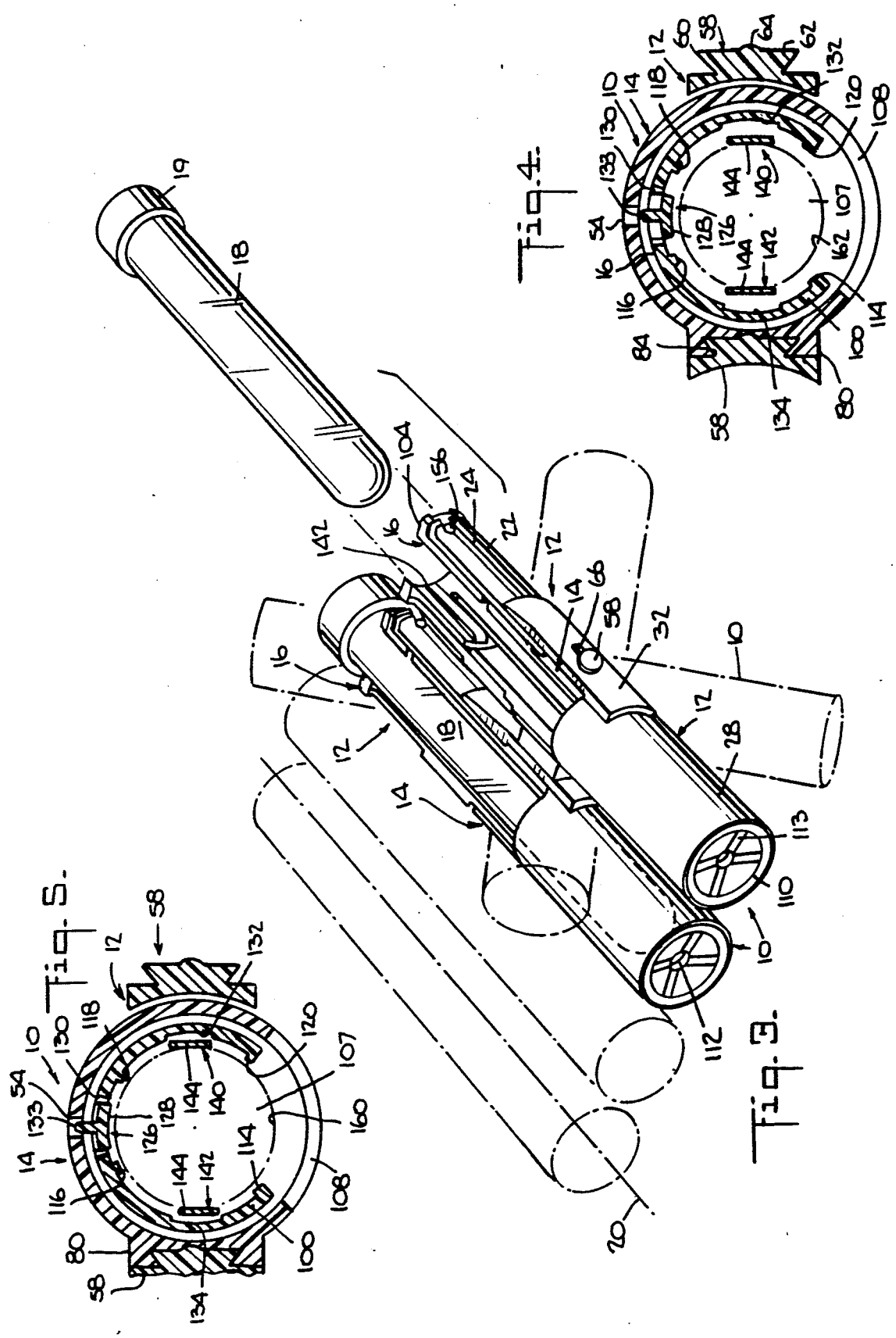

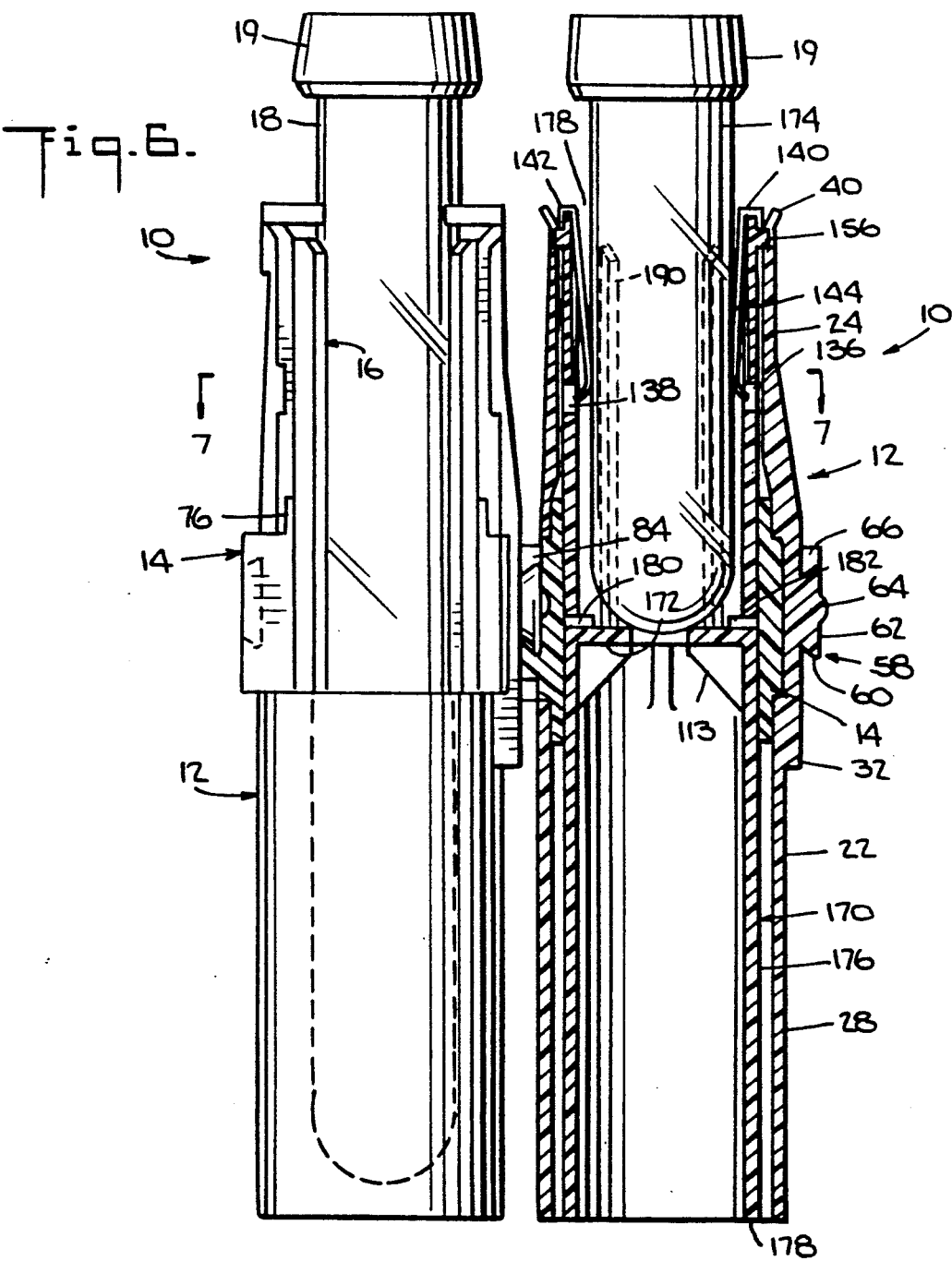

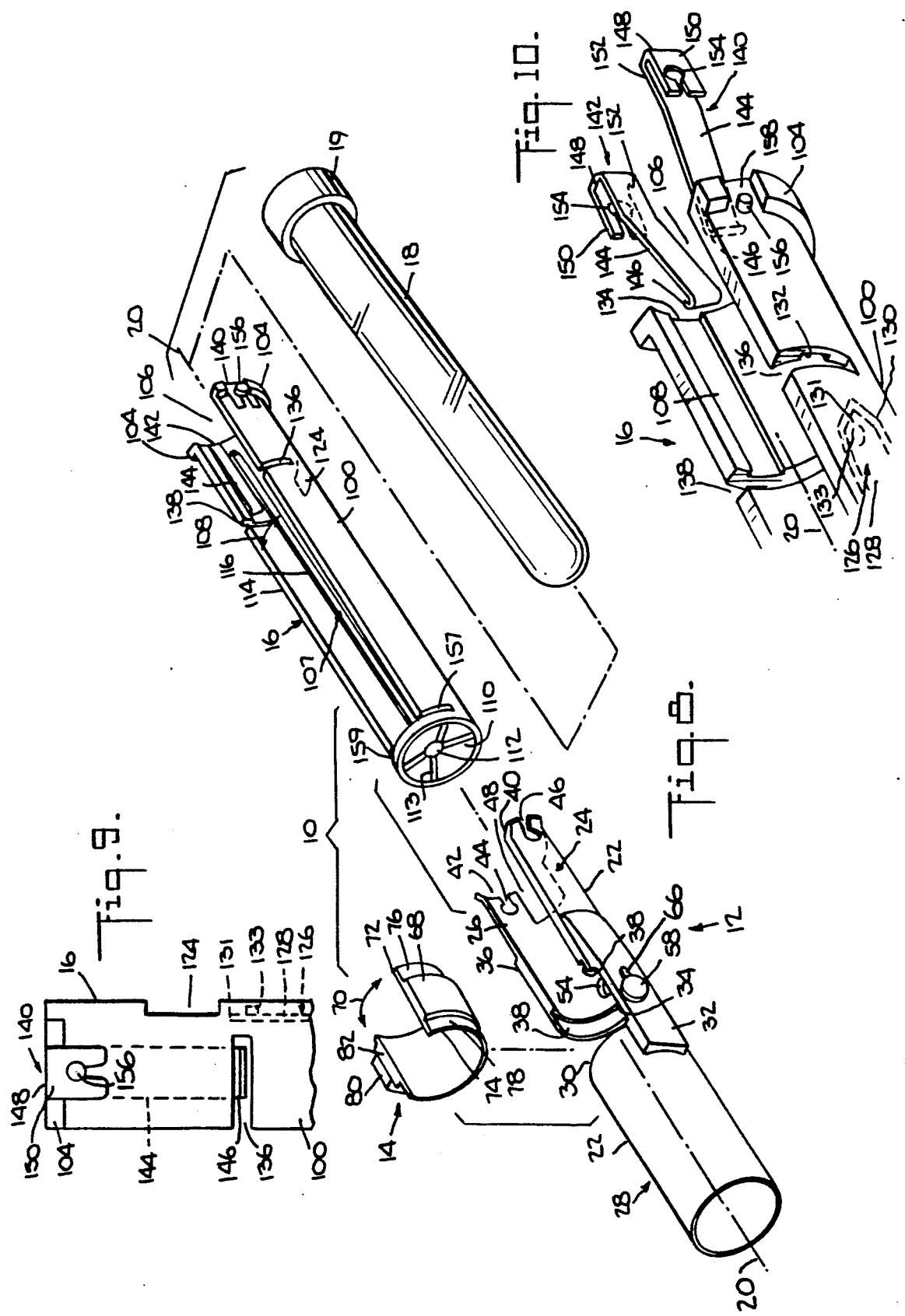

SPRING BIASED TEST TUBE HOLDER

BACKGROUND OF THE INVENTION

This invention relates to an improved test tube holder that permits easy release of a test tube contained therein and also can be linked in continuous fashion to other similar test tube holders for relative pivoting and tilting.

A predecessor of the present test tube holder is shown in my copending application, now U.S. Pat. No. 4,944,924, which is incorporated herein by reference. The predecessor test tube holder is likewise capable of being linked together with other similar test tube holders in continuous fashion to permit relative pivoting and tilting of the test tube holders. In addition, the predecessor test tube holder as well as the present test tube holder can be employed in the automatic sampling system of U.S. Pat. No. 4,861,553 and both holders include a plastic adapter member that receives the test tube. However, in the predecessor test tube holder the adapter member is sized to snugly hold the test tube and it is difficult to control the amount of retention force applied by the plastic adapter against the periphery of the test tube. In addition, the test tube is fully enveloped by the adapter member of the predecessor test tube holder. Thus removal of the test tube from the predecessor test tube holder can occasionally be an arduous task.

Since the predecessor test tube holder is a reusable device wherein test tubes are repeatedly inserted into and withdrawn from the test tube holder, the facility with which a test tube can be inserted in the test tube holder and removed therefrom is a critical factor in assuring trouble-free usage of the test tube holder.

It is thus desirable to provide an improved test tube holder which permits easy insertion and removal of a test tube and which permits easy access to the inserted test tube to facilitate subsequent removal of the test tube from the test tube holder.

OBJECTS AND SUMMARY OF THE INVENTION

Among the several objects of the invention may be noted the provision of a novel test tube holder, a novel test tube holder which permits easy access to a test tube held therein to facilitate removal of the test tube from the test tube holder, a novel test tube holder which accommodates test tubes of different size and permits easy insertion and removal of the test tube from the test tube holder, a novel test tube holder which can be connected to other similar test tube holders in a continuous linkage wherein any one of the test tube holders can be pivoted about a longitudinal axis of another test tube holder in the linkage and a novel test tube holder which can be connected to other similar test tube holders in a continuous linkage wherein any one of the test tube holders in the linkage can be tilted with respect to the other test tube holders.

Other objects and features of the invention will be in part apparent and in part pointed out hereinafter.

In accordance with the present invention, the test tube holder includes an elongated tubular member provided with a pivot member pivotally supported on the elongated tubular member for pivotal movement about a longitudinal axis of the tubular member. Latch members are respectively provided on the tubular member and the pivot member to permit linking of test tube holders together in a continuous chain.

An adapter member for holding test tubes is insertable in the elongated tubular member. A test tube is insertable in and removable from the adapter member and different adapter members can be interchanged to hold different size test tubes.

Flexible biasing means are provided on the adapter member and extend into a test tube receiving space of the adapter member. Upon insertion of the test tube into the receiving space, the biasing means resiliently engage the test tube to exert a predetermined biasing force on the test tube to maintain the test tube in the adapter member. The biasing force of the biasing springs on the test tube can be easily predetermined. The test tube holder is also sized to enable a test tube to project beyond the adapter member thereby permitting easy insertion and removal of the test tube from the test tube holder. In addition, an adapter member that holds a test tube of one size can be interchanged in the test tube holder with an adapter member that holds a test tube of another size. Thus different adapter members are interchangeable to permit the test tube holders to hold different size test tubes. The linkage of test tube holders can thus hold a variety of test tubes of different size.

The invention accordingly comprises the constructions hereinafter described, the scope of the invention being indicated in the claims.

DESCRIPTION OF THE DRAWINGS

In the accompanying drawings,

FIG. 3 is a perspective view of a linkage of test tube holders incorporating one embodiment of the invention, with one test tube being shown separate from its corresponding test tube holder;

FIG. 4 is an enlarged sectional view thereof showing biasing springs and a detent member in a relaxed undeflected position;

FIG. 5 is a view similar to FIG. 4 showing the biasing springs and detent member in a deflected position;

FIG. 6 is an enlarged elevational view thereof partly shown in section;

FIG. 7 is a sectional view taken on the line 7—7 of FIG. 6;

FIG. 8 is an exploded perspective view thereof;

FIG. 9 is an enlarged fragmentary detail view thereof; and

FIG. 10 is an enlarged fragmentary perspective view thereof;

Corresponding reference characters indicate corresponding parts throughout the several views of the drawings.

DETAILED DESCRIPTION OF THE INVENTION

Figure 1:
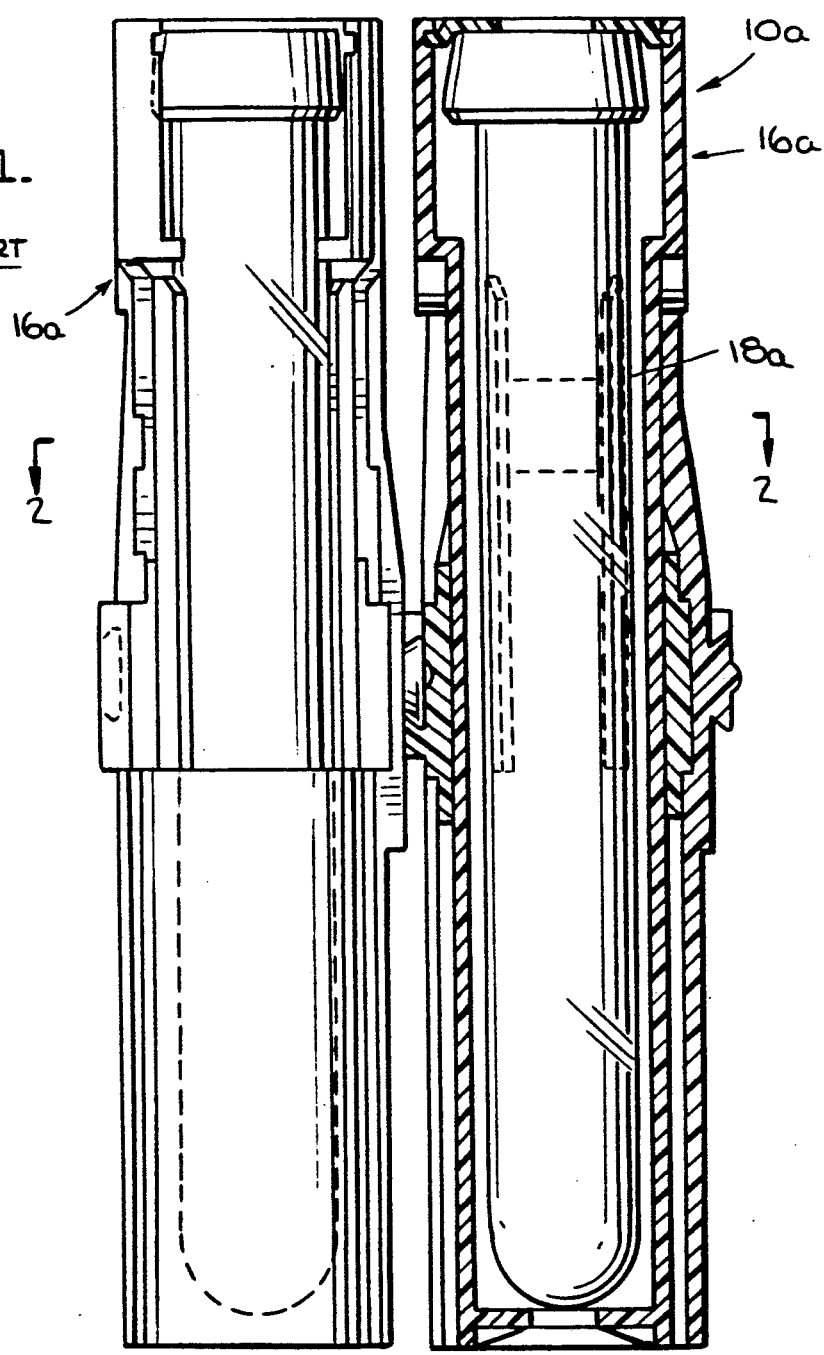
FIG. 1 is an enlarged elevational view, partly shown in section, of a linkage of prior art test tube holder devices.

A test tube holder incorporating one embodiment of the invention is generally indicated by the reference number 10 in FIG. 3.

Unless otherwise indicated, all components of the test tube holder are formed of a durable resilient plastic material such as nylon.

Referring to FIG. 3, the test tube holder 10 comprises an elongated tubular member 12, a pivot member 14 pivotally supported on the tubular member 12, and an adapter member 16 insertable in the tubular member 12 for accommodating a test tube 18. Preferably the adapter member 16 is formed of a relatively clear plastic material such as polypropylene.

The tubular member 12, which is elongated along a longitudinal axis 20, has a generally cylindrical wall 22. The terms "axial" and "radial" as used herein relate to the longitudinal axis 20 as a reference. Thus "axial" refers to a distance or direction parallel to the longitudinal axis 20 and "radial" refers to a distance, direction or location that has a center on the longitudinal axis 20.

The cylindrical wall 22 includes a split portion 24 having an axial slot 26 (FIG. 8). The axial slot 26 has a radial extent of at least 90° with respect to the longitudinal axis 20. The tubular member 12 also includes a main body portion 28 and a radial slot 30 (FIG. 8) formed in the cylindrical wall 22 intermediate the split portion 24 and the main body portion 28.

As most clearly shown in FIG. 8 the wall portion 22 has a reinforced section 32 which bridges the radial slot 30 to adjoin the main body portion 28 and the split portion 24. An interior recess 34 (FIG. 8), formed in the reinforced section 32, is radially continuous with the radial slot 30.

The split portion 24 has a radially reinforced section 36 (FIG. 8) at the radial slot 30. The reinforced section 36 is formed with an interior radial recess 38 that is stepped away from the interior recess 34 toward the longitudinal axis 20. A lip portion 40 which can be slightly beveled is formed at an open free end 42 of the tubular member 12. The free end 42, which is also the terminus of the split portion 24, is formed with radially opposite, axially directed key slots 44 and 46. An additional enlarged, axially directed slot 48 (FIG. 8) is also formed at the free end 42. The slot 48 provides access to the adapter member 16 to facilitate insertion and removal of the adapter member 16 from the tubular member 12.

A detent opening 54 is formed in the wall 22 of the split portion 24 radially opposite the axial slot 26.

As most clearly shown in FIG. 4, the internal diameter of the main body portion 28 is of greater dimension than the internal diameter of the split portion 24.

A dove-tail latch member 58 (FIG. 8) is formed on the reinforced section 32 and includes a conical surface 60 tapering toward the wall 22 and a base surface 62 with a detent dimple 64. The latch member 58 is oriented approximately 90° away from the slot 26. A combination lever portion and stop surface 66 is formed as a stub-like projection that extends radially from the base 62 toward the free end 42 of the tubular member 12.

Referring to FIG. 8, the pivot member 14 is in the shape of a split collar and includes a generally cylindrical wall portion 68 with an axial slot 70 that constitutes the split portion of the collar. A pair of axially spaced exterior radial recesses 76 and 78 are formed at opposite ends 72 and 74 of the pivot member 14. The pivot member 14 further includes a latch member 80 formed between the recesses 76 and 78 at an axial edge 82 of the axial slot 70. The latch member 80 comprises a U-shaped latch pocket 84 of complementary shape to the conical surface 60 of the latch member 58 to permit detachable engagement therebetween, and includes a detent recess 86 to receive the detent dimple 64.

Referring to FIG. 8, the adapter member 16, which is elongated along the longitudinal axis 20, has a generally cylindrical wall 100 with a radial flange 104 at an open end 106. The adapter member 16, being generally tubular, includes a hollow interior test tube receiving space 107 accessible from the open end 106. An axial slot 108 which opens to the receiving space 107 is formed in the wall 100 and extends from a base end 110 to the open end 106.

Preferably, the axial slot 108 has a radial extent of at least 90° with respect to the longitudinal axis 20. A stabilizer opening 112 is formed in the base end 110. The opening 112 also permits access to an optional removal tool (not shown) which can be used to facilitate removal of the test tube 18 from the test tube holder 10 and also permits flush through cleaning of the adapter member 16. Reinforcing flanges such as 113 can be provided at the base 112. Elongated radially spaced projecting spines 114, 116, 118 and 120 (FIG. 4) are formed on the interior surface of the wall 100. The spines 114, 116, 118 and 120 extend axially from the base end 110 to a position slightly below the open end 106.

A window opening 124 is formed in the wall 100 radially opposite the axial slot 108 for optical viewing of the test tube 18 to ascertain its presence.

Referring to FIGS. 4, 5, 9 & 10, a detent member 126 is provided in the wall portion 100 radially opposite the axial slot 108. The detent member 126 includes a flexible deflectable strip 128 formed integrally with the wall portion 100 within the confines of a U-shaped slit 130. The strip 128 has a free end portion 131 with a detent button 133 sized to engage the detent Opening 54 in the tubular member 12.

Referring to FIGS. 8-10 the wall 100, at the open end 106, within the interior space 107, is formed with generally opposite internal channels 132 and 134 that extend longitudinally from the open end 106 to respective radial clearance slots 136 and 138. A pair of biasing springs 140 and 142, formed of a suitable known spring metal material, such as stainless steel, are clipped onto the wall 100 at the open end 106 in alignment with the respective channels 132 and 134.

The biasing spring 140, which is identical to the biasing spring 142, includes an elongated resilient contact section 144 having a looped free end portion 146. The spring 142 also includes a U-shaped mounting section 148 at an end opposite the looped free end portion 146.

The mounting section 148 includes spaced legs 150 and 152. The leg 152 forms an obtuse angle with the contact section 144 and the leg 150 includes a detent recess 154 sized to engage a detent projection such as 156 (FIG. 10) formed at a gap such as 158 in the flange 104.

The legs 150 and 152 are spaced a predetermined amount to snugly sandwich the wall 100 at the gap 158. If desired, the edges of the legs 150 & 152 can be deformed to provide tangs (not shown) which resist withdrawal of the springs 140 & 142 once they have been installed on the adapter member 16.

Under this arrangement the contact section 144 is disposed in the receiving space 107 and is inclined radially inwardly toward the longitudinal axis 20 from the mounting section 148 to the looped end portion 146. The biasing spring 142 is also mounted to the wall 100 of the adapter member 16 in a manner similar to that described for the biasing spring 140. Thus the contact sections 144 of each of the biasing springs 140 and 142 converge toward each other in the receiving space 107.

As most clearly shown in FIG. 8, a pair of slits 157 & 159 are formed in the tubular wall 100 just inwardly of the base 110. The section of tubular wall 100 between the slits 157, 159 and the clearance slots 136, 138 can thus be radially expanded a predetermined amount.

In using the test tube holder 10, the pivot member 14 is disposed in the radial slot 30 of the tubular member 12 such that the radial recess 76 of the pivot member 14 engages the radial recess 38 of the tubular member 12 at the split portion 24, and the radial recess 78 of the pivot member 14 engages the interior surface of the main body portion 28 of the tubular member 12. Because of the pivotal relationship between the pivot member 14 and the tubular member 12, the tubular member 12 is likewise pivotable with respect to the pivot member 14.

Once the pivot member 14 and the tubular member 12 have been assembled, the latch member 58 of one test tube holder 10 can be engaged in the latch member 80 of another test tube holder 10 in the manner shown in FIGS. 6 and 7.

Since the pivot member 14 incorporates the latch member 80, the pivot member 14 along with the latch members 80 and 58 constitute latching means for detachably joining adjacent test tube holders 10 to permit bi-directional radial pivotal movement and bi-directional longitudinal tilting movement. Under this arrangement, a continuous linkage of test tube holders 10 can be connected together to form a linkage of unlimited length. The relative pivotal movement between test tube holders in a linkage is characterized by the longitudinal axis of one test tube holder serving as a center of rotation for another test tube holder.

In addition to relative pivotal movement between test tube holders that have been latched together, there is relative tilting movement as shown schematically in FIG. 3. The latch connection between adjacent test tube holders, such as shown in FIGS. 6 and 7, permits one test tube holder 10 to be tilted with respect to another test tube holder 10 such that the longitudinal axes of each test tube holder can be inclined or skewed with respect to each other.

The test tube holder assembly 10 is completed by insertion of the adapter member 16 into a previously assembled tubular member 12 and pivot member 14. Insertion of the adapter member 16 into the tubular member 12 has no effect on the pivoting or tilting relationships previously described for the sub-assembly of the tubular member 12 and the pivot member 14 since the pivot member 14 embraces the adapter member 16 with sufficient clearance to permit relative pivotal movement of the pivot member 14 with respect to the adapter member 16.

The adapter member 16 is inserted into the free end 42 of the tubular member 12 with the axial slot 108 of the adapter member 16 substantially aligned with the axial slot 26 of the tubular member 12. This alignment is maintained by engagement of the detent projections 156, 156 on the adapter member 16 in the key slots 44 and 46 at the free end 42 of the tubular member 12. Such alignment also enables the detent button 133 of the detent member 126 to align with the detent opening 54 of the tubular member 12 in the manner shown in FIG. 4.

The test tube 18, which can be of the type sold under the trade name Vacutainer by Becton Dickinson, is inserted in the receiving space 107 of the adapter member 16 only after the adapter member 16 is positioned in the tubular member 12. Insertion of the test tube 18 in the adapter member 16 causes the deflection strip 128 to move radially away from the longitudinal axis 20 such that the detent button 133 engages the detent opening 54. Thus, the presence of the test tube 18 in the previously assembled adapter member 16 and tubular member 12 will not permit separation of the adapter member 16 from the tubular member 12. The test tube 18 is normally sealed with a stopper 19.

Upon insertion of the test tube 18 through the open end 106 of the adapter member 16 into the receiving space 107, the test tube periphery engages the resilient contact sections 144, 144 of the biasing springs 140 and 142 as most clearly shown in FIG. 6. The adapter member 16 is axially sized such that the test tube 18 bottoms against the stabilizer opening 112 at the base 110.

Referring to FIG. 5, the projecting spines 114, 116, 118 and 120 project radially inwardly toward the longitudinal axis 20 and define points on a substantially circular outline, shown dotted at 160, that represents a maximum diametrical capacity for the test tube holder 10.

Referring to FIG. 4, when the adapter member 16 does not have a test tube 18 installed therein, the resilient contact sections 144, 144 of the biasing springs 140 and 142 are relaxed and normally project radially inwardly toward the longitudinal axis 20 a maximum amount represented by the dotted circular outline 162. The circular outline 162 is of lesser diametrical magnitude than the circular outline 160.

The test tube holder 10 is thus adapted to accommodate test tubes within a range of diametrical magnitudes defined by the circular outlines 160 and 162. Within this diametrical range the resilient contact sections 144, 144 of the biasing springs 140 and 142 can exert a force against a test tube 18 retained in the adapter member 16 and thereby detent such test tube.

The flexibility and biasing force exerted by the biasing springs on a test tube 18 is based in part on the resiliency and thickness of the spring material constituting the springs 140 and 142. For example, the spring 140 can be formed of 301 stainless steel spring, temper 190,000 p.s.i. tensile having a thickness of 0.012 inches.

The biasing force can thus be easily predetermined in accordance with the specification of the spring material for the springs 140 and 142 and is relatively uniform over the range of diameter variations expected. Under this arrangement, a large tube can be inserted and removed with virtually the same force as a small tube.

If, for example, the biasing springs 140 and 142 define a circular outline 162 having a diametrical magnitude of approximately 10 millimeters and the spines 114, 116, 118 and 120 define a circular outline 160 having a diametrical magnitude of approximately 13 millimeters, a test tube diameter in the range of approximately 11 millimeters to 12 millimeters can be easily inserted into and held by the adapter member 16 in the manner shown in FIGS. 3, 6 and 7.

Preferably the test tubes 18 accommodated in the adapter member 16 should not contact the projecting spines 114, 116, 118 and 120. The spines 114, 116, 118 and 120 are not intended to exert any significant detent or frictional force on the test tube 18 that is held in the adapter member 16. Preferably the substantial portion of any detent force or detent friction exerted on the test tube 18 while it is held in the adapter member 16 is provided by the biasing springs 140 and 142.

The adapter member 16 is axially elongated a predetermined amount to permit the test tube 18 to project a predetermined amount from the test tube holder 10 and thereby facilitate removal of the test tube 18 from the test tube holder 10. Under this arrangement, the detent force of the biasing springs 140 and 142 which hold the test tube 18 in the adapter member 16 can be easily overcome by gripping the projecting portion of the test tube.

It will be noted that the window portion 124 of the adapter member 16 aligns with the recess 48 of the tubular member 12 to permit a sensor (not shown) to check the presence of the test tube 18 in the adapter member 16.

Figure 2:
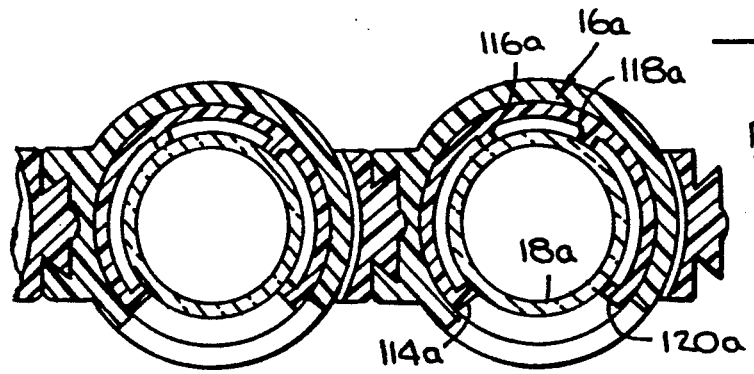
FIG. 2 is a sectional view thereof taken on the line 2—2 of FIG. 1.

Referring to the prior art test tube structure as shown in FIGS. 1 and 2, and described in detail in U.S. Pat. No. 4,944,924, an adapter member 16a which differs from the adapter member 16 in various respects that will be discussed, includes projecting spines 114a, 116a, 118a and 120a that substantially correspond to the spines 114, 116, 118 and 120 of the adapter member 16. However the spines 114a, 116a, 118a and 120a of the prior art test tube holder 10a provide substantially the entire biasing force that detents the test tube 18a in the test tube holder 10a.

The adapter member 16a of the prior art test tube holder 10a is also formed of plastic and it is intended that the spines 114a-120a of such adapter member hug and thus detent a test tube therein. However, since plastic is less resilient and flexible than spring metal, and has less memory than spring metal, it is necessary to overcompensate for such properties by establishing a diametrical gripping magnitude for the adapter member 16a that is slightly less than the cross sectional diameter of the test tube 18a to be held therein.

The diametrical gripping magnitude of the adapter member 16a can be represented by a circular outline defined by the projecting spines 114a, 116a, 118a and 120a. Thus when a test tube such as 18a is inserted into the test tube holder 10a as shown in FIG. 2, the test tube periphery presses against the projecting spines 114a, 116a, 118a and 120a which provide a frictional detent that holds the test tube 18a in the adapter member 16a.

It has been found that under this arrangement, it is difficult to predetermine the exact level of detent force which will be imposed by the adapter member 16a upon the test tube 18a inserted therein. Generally the detent force imposed by the adapter member 16a on the test tube holder 18a is greater than necessary to adequately hold the test tube 18a within the adapter member 16a. Thus it is occasionally necessary to accomplish removal of the test tube 18a from the test tube holder 10a with an optional removal tool (not shown). The need for an optional removal tool is substantially eliminated in the test tube holder 10 of the present invention because the detent force can be more easily predetermined with use of the biasing springs 140 and 142.

In another embodiment of the invention as shown in FIG. 6, an adapter member 170 includes an intermediate base portion 172 that replaces the base portion 110 to accommodate a test tube 174 of shorter axial extent than the test tube 18. A tubular wall 176 of closed circular periphery extends between the intermediate base 172 and a free end 178 of the adapter member 170 through which a test tube is inserted. An axial slot (not shown) similar to the axial slot 108 but of reduced axial extent, is provided in the tubular wall 176 between a tube insertion end 178 and the intermediate base and 172. Base slits 180 & 182 corresponding to the base slits 157 & 159 are provided in the wall 176 inwardly of the base 172. The adapter member 170 is in all other respects similar to the adapter member 16 but includes axially shortened projecting spines, such as 190, that correspond to the projecting spines 114, 116, 118 and 120 of the adapter member 16.

Thus, adapter members of different size can be interchanged in the test tube holder 10 for accommodating test tubes 18 and 174 of different axial extent. Test tubes of different axial extent in correspondingly sized adapter members can all be held in a uniformly sized tubular member 12. Accordingly, a linkage of test tube holders 10 can accommodate test tubes 18 and 174, for example, of different axial extent.

Some advantages of the present invention evident from the foregoing description include a test tube holder wherein test tubes of different diametrical magnitude and different axial extent can be easily inserted into or removed therefrom. A further advantage is that the test tube holder can be connected with other test tube holders to form a linkage of unlimited length. Any of the test tube holders in the linkage can be pivoted with respect to other test tube holders and also tilted with respect to other test tube holders.

In view of the above, it will be seen that the several objects of the invention are achieved and other advantageous results attained.

As various changes can be made in the above constructions without departing from the scope of the invention, it is intended that all matter contained in the above description or shown in the accompanying drawings shall be interpreted as illustrative and not in a limiting sense.

What is claimed is:

1. A test tube holder comprising an elongated tubular adapter member having a longitudinal axis and an interior receiving space for accommodating a test tube with a predetermined diameter, said adapter member including an elongated curved wall defining said receiving space and an open end for insertion of said test tube into said receiving space, said receiving space being radially oversized relative to the predetermined diameter of said test tube to provide radial clearance between the test tube and the adapter member, flexible biasing means including a pair of leaf springs disposed substantially radially opposite each other on said adapter member, each said leaf spring including one end portion affixed to said adapter member and an opposite deflectable free end portion that extends a predetermined radial amount into said receiving space prior to insertion of said test tube, to engage and center said test tube in said space and exert a predetermined biasing force on said test tube to detachably retain said test tube in said adapter member, said elongated curved wall having a spring clearance opening for each said spring, the free ends of said springs being deflectable away from said longitudinal axis toward or into respective said clearance openings by said test tube upon insertion of said test tube into said receiving space, said clearance openings being sized to accommodate said free ends such that said free ends do not bear against said adapter member.

2. A test tube holder as claimed in claim 1 wherein the free end of each said leaf spring is deflectable from a relaxed, non-deflected limit position to a maximum deflection limit position proximate said wall.

3. The test tube holder as claimed in claim 1 wherein each said leaf spring has an elongated portion between said end portions, and clearance spaces are provided in the curved wall of said adapter member for receiving the respective elongated portions of each said leaf spring when the respective free end portions are deflected to said clearance opening.

4. A test tube holder as claimed in claim 2 wherein said wall includes a recess for accommodating said spring when said spring is in said maximum deflection limit position.

5. A test tube holder as claimed in claim 1 wherein said said interior receiving space is of a predetermined longitudinal extent that is of a lesser magnitude than the longitudinal extent of said test tube to enable said test tube to extend a predetermined amount beyond the open end portion of said tubular member.

6. A test tube holder as claimed in claim 5 wherein said adapter member has a base end portion opposite said open end portion, and an intermediate base portion between said open end portion and said base end, said intermediate base end and said open end defining the longitudinal extent of said interior receiving space.

7. A test tube holder as claimed in claim 6 wherein said said intermediate base portion is at selectable distances from said open end to accommodate test tubes of selectable longitudinal extents.

8. A test tube holder comprising,
    (a) an elongated tubular member, elongated along a longitudinal axis, said tubular member having a first wall portion extending in the direction of said longitudinal axis and a first latch member formed on said first wall portion,
    (b) a pivot member supported on said elongated tubular member to permit relative pivotal movement between said pivot member and said tubular member about said longitudinal axis, said pivot member having a second wall portion extending in the direction of said longitudinal axis and a second latch member formed on said second wall portion such that said first and second latch members are relatively movable toward and away from each other in a radial direction with reference to said longitudinal axis when there is said relative pivotal movement between said pivot member and said tubular member in opposite radial directions about said longitudinal axis,
    (c) an elongated adapter member for accommodating a test tube, said adapter member being insertable in and removable from said tubular member, and including a test tube receptacle portion for accommodating said test tube,
    (d) said adapter member including an elongated curved wall defining said receiving space, and an open end for insertion of said test tube into said receiving space, flexible biasing means including a pair of leaf springs disposed substantially radially opposite each other on said adapter member, each said leaf spring including one end portion affixed to said adapter member and an opposite deflectable free end portion that extends a predetermined radial amount into said receiving space prior to insertion of said test tube, to engage and center said test tube in said space and exert a predetermined biasing force on said test tube to detachably retain said test tube in said adapter member, said elongated curved wall having a spring clearance opening for each said spring, the free ends of said springs being deflectable away from said longitudinal axis toward or into respective said clearance openings by said test tube upon insertion of said test tube into said receiving space, said clearance openings being sized to accommodate said free ends such that said free ends do not bear against said adapter member.

9. A test tube holder as claimed in claim 8 wherein said adapter member includes a receptacle portion of a first predetermined size for accommodating said test tube.

10. A test tube holder as claimed in claim 9 wherein said adapter member is interchangeable with another said adapter member having a receptacle portion of a second predetermined size for accommodating a second said test tube corresponding to said second predetermined size.

11. A test tube holder as claimed in claim 8 wherein said adapter member and said tubular member are provided with engaging means to locate said adapter member in a predetermined radial orientation with respect to said tubular member when said adapter member is inserted in said tubular member.

12. A test tube holder as claimed in claim 8 further including detent means for maintaining said adapter member inseparable from said tubular member when a test tube is present in the receptacle portion of said adapter member and permitting separation of said adapter member and said tubular member when said adapter member is without a test tube.

13. A test tube holder comprising,
    a) an elongated tubular member, elongated along a longitudinal axis, said tubular member having a first wall portion extending in the direction of said longitudinal axis and a first latch member formed on said first wall portion,
    b) an elongated adapter member for accommodating a text tube, said adapter member being insertable in and removable from said tubular member and including a test tube receptacle portion for accommodating said test tube,
    c) said adapter member and said tubular member including detent means for detenting said adapter member in said tubular member, said detent means being in a first detent condition when said adapter member is inserted in said tubular member and said adapter member is without said test tube, said first detent condition permitting separation of said adapter member from said tubular member, said detent means being movable to a second detent condition upon insertion of said test tube into said adapter member after said adapter member is inserted in said tubular member said second detent condition rendering said adapter member inseparable from said tubular member while said test tube is present in said adapter member.

14. The test tube holder as claimed in claim 13 wherein said detent means include an actuator member on one of said tubular member and said adapter member, engageable with complementary engagement means on the other of said members.

15. The test tube holder as claimed in claim 14 wherein said actuator member includes a flexible deflectable strip having a first latching member and said complementary engagement means include a complementary engaging portion for said first latching member.

16. The test tube holder as claimed in claim 15 wherein said first latching member includes a detent projection and said complementary engaging portion includes a detent recess.

17. The test tube holder as claimed in claim 14 wherein said adapter member is provided with said flexible deflectable actuator member and said tubular member is provided with said complementary engagement means.

* * * * *